United States Patent

Greenwood

[11] Patent Number: 4,701,429
[45] Date of Patent: Oct. 20, 1987

[54] CATALYST REGENERATION WITH VARYING AIR FLOW TO BURN-OFF ZONE FROM DRYING ZONE THROUGH HALOGENATION ZONE

[75] Inventor: Arthur R. Greenwood, Niles, Ill.
[73] Assignee: UOP Inc., Des Plaines, Ill.
[21] Appl. No.: 920,556
[22] Filed: Oct. 20, 1986

Related U.S. Application Data

[62] Division of Ser. No. 825,296, Feb. 3, 1986, abandoned.
[51] Int. Cl.$^4$ .................. B01J 38/44; B01J 23/96; C10G 35/085
[52] U.S. Cl. .................... 502/37; 208/140; 422/223
[58] Field of Search ............... 502/37, 47, 48; 208/140; 422/216, 223, 191

[56] References Cited

U.S. PATENT DOCUMENTS

| | | | |
|---|---|---|---|
| 3,652,231 | 3/1972 | Greenwood et al. | 208/140 |
| 3,706,536 | 12/1972 | Greenwood et al. | 208/140 |
| 3,981,824 | 9/1976 | Greenwood et al. | 502/37 |
| 4,094,814 | 6/1978 | Lemberger et al. | 502/37 |
| 4,094,817 | 6/1978 | Olson et al. | 502/37 |

*Primary Examiner*—P. E. Konopka
*Attorney, Agent, or Firm*—Thomas K. McBride; John F. Spears, Jr.; Richard J. Cordovano

[57] ABSTRACT

Method for effecting multiple treatment steps needed to regenerate spent hydrocarbon conversion catalyst. Catalyst is contacted with a hot oxygen-containing gas stream in order to remove coke which accumulates on the catalyst while it is in a hydrocarbon conversion zone. After the coke is burned off in a combustion zone, catalyst is passed into a halogenation zone wherein a halogen is deposited on the catalyst. Catalyst leaving the halogenation zone is passed into a drying zone for removal of water formed in the combustion zone which has remained on the catalyst instead of being carried off with combustion gases. Water removal is accomplished by passing a hot dry air stream through the catalyst in the drying zone. A portion of the air stream which has passed through the drying zone is passed through the halogenation zone in admixture with a halogen, while the balance of the air stream leaving the drying zone is removed from the regeneration apparatus by venting it to the atmosphere or another disposal location. That portion of the air stream which is utilized in the halogenation zone is then passed into the combustion zone where it provides the oxygen required to accomplish burning of the carbon. The flow of air into the drying zone is controlled at a rate established to accomplish the degree of desired drying. The oxygen content of the gas flowing to the burn-off zone is monitored and the amount of gas vented from the drying zone is adjusted in order to maintain the desired concentration of oxygen. In this manner, the amount of air supplied to the burn-off zone is adjusted independently of the air supplied to the drying zone.

5 Claims, 1 Drawing Figure

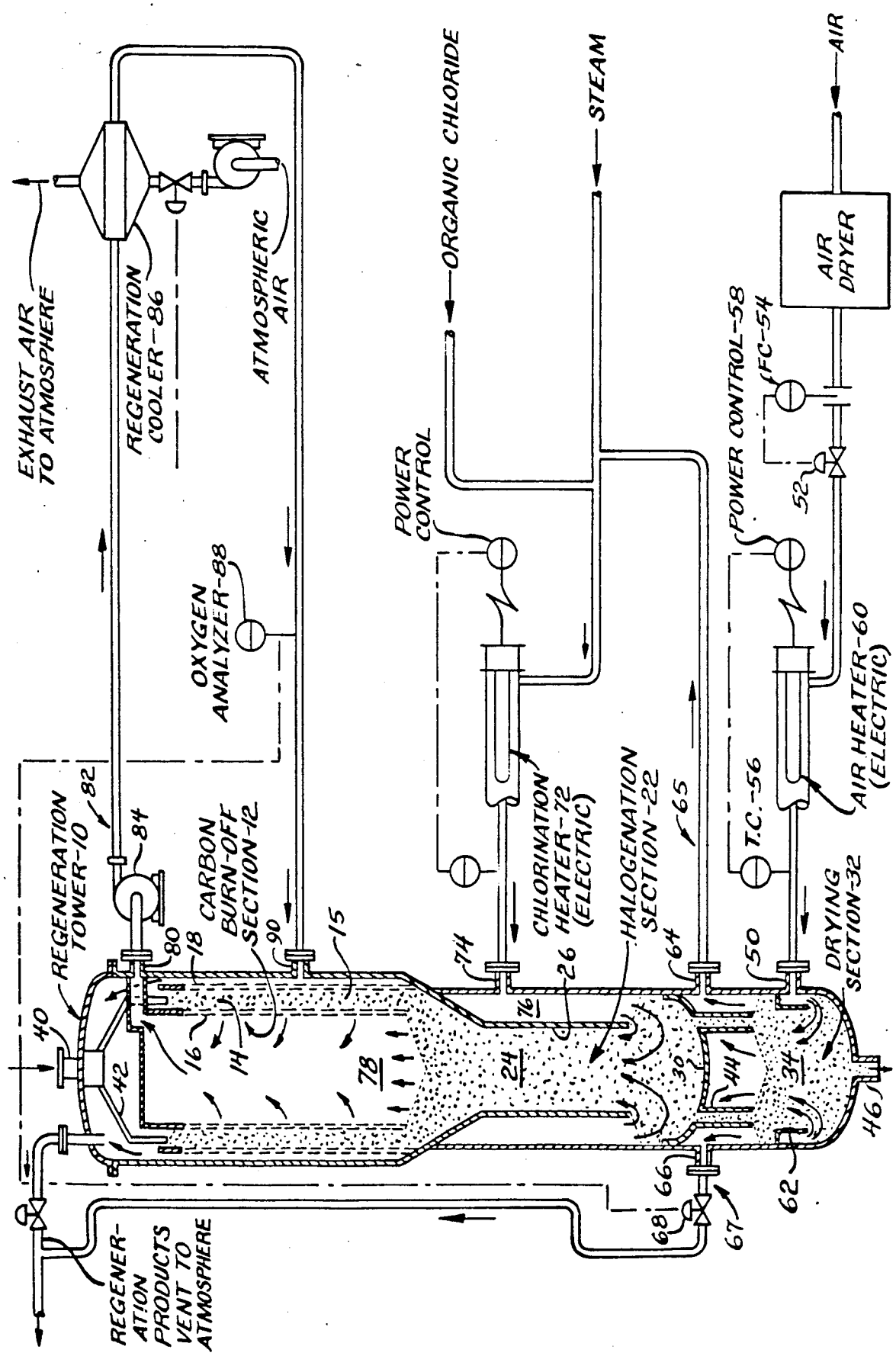

CATALYST REGENERATION WITH VARYING AIR FLOW TO BURN-OFF ZONE FROM DRYING ZONE THROUGH HALOGENATION ZONE

CROSS-REFERENCE TO RELATED APPLICATION

This is a Divisional application of pending application Ser. No. 825,296, filed on Feb. 3, 1986 now abandoned.

BACKGROUND OF THE INVENTION

The invention relates to a process and an apparatus of the type wherein a fluid such as a gas or vapor is used to treat a particulate type of contact material such as a catalyst, which is in a bed which is passing by gravity from one reaction or treating zone to another. One example of a process carried out in such an apparatus is catalyst regeneration. A specific example of a catalyst regeneration apparatus for use with a catalyst whose surface has been covered with coke during a catalytic reforming operation, and wherein the catalyst moves downward through a carbon burn-off section, through a halogenation section and into a drying section, is shown and described in Greenwood et al., U.S. Pat. No. 3,652,231, the subject matter of which is herein incorporated by reference. In the embodiment of FIG. 3 of the referenced patent, the catalyst moves downwardly as an annular bed in the annular space between a pair of spaced concentric perforated screens and is subjected initially to a combustion gas comprising a radially flowing recycle flue gas having a relatively low oxygen content and secondly, to a radially flowing second gas containing air, a halogen and steam. To achieve these flows, both the recycle flue gas and the second gas are circulated to the respective carbon burn-off and halogenation sections by separate fans or blowers. The catalyst then continues to move from the aforesaid annular space containing the halogenation section, as a descending bed, into a generally cylindrical drying section wherein it is contacted by a hot and dry air stream, or other suitable drying medium, before it exits the bottom of the apparatus. The drying medium is typically distributed by an arrangement of perforated distributor members including a central trunk with a plurality of laterally extending branches positioned generally uniformly in a horizontal plane near the bottom of the drying section. It is known that the mere presence of any pipes in the catalyst bed produces an obstruction in the downward flow path of the catalyst bed which can possibly accelerate attrition. However, I have found that any problem of possible attrition due to the presence of distributor pipes can be solved by uniformly feeding the gas to be distributed into the bottom of a cylindrical bed from the bottom of an annular plenum surrounding the bed. Such a construction is disclosed in my co-pending U.S. patent application, Ser. No. 780,788 filed Sept. 27, 1985, and assigned to a common assignee.

In regenerator units made in accordance with the teachings of the aforesaid U.S. Pat. No. 3,652,231, the quantity of air which can enter the drying section is controlled in response to the measured oxygen content of the combustion gas which is passed into the carbon burn-off section. As the air from the drying section passes up through the inside of the annular burn-off section, it becomes mixed with the flue gas which contains almost no oxygen after burning off the coke. The resultant gas mixture produces a recycle flue gas or combustion gas which desirably contains only about 0.8% oxygen. The oxygen content of this combustion gas must be very accurately controlled and thus, in such units, the amount of drying air must be accurately controlled. Too much oxygen in the combustion gas supplied to the coke covered catalyst would overheat and damage the catalyst while too little oxygen would allow too much coke to remain on the catalyst so that it would overheat when it was contacted by the air in the halogenation zone. Although it is essential to control the oxygen content of the combustion gas, it is also desirable that the amount of air entering the drying zone be controlled independently in order that the catalyst can be dried to the desired degree. It is also desirable that air from the drying zone be distributed to the halogenation zone since the use of such air can reduce the amount of additional heating required and can also utilize the pressure of the drying zone air which is supplied by the plant air supply. Since the use of a fan or blower to circulate air through the halogenation zone of the aforementioned prior art apparatus is expensive from both the standpoint of energy consumed as well as from the standpoint of capital equipment expense, it would be desirable to eliminate such fan.

BRIEF SUMMARY OF THE INVENTION

It is among the objects of the present invention to provide a process and apparatus for permitting the total amount of drying air to the drying zone of a catalyst regenerator to be controlled independently of that portion of the drying air which is subsequently combined with the flue gas to form a recycle flue gas which is distributed to the carbon burn-off section as the combustion gas.

Another object of the invention is to provide a catalyst regenerator in which the halogenation and drying sections are cylindrical in shape and in which the supply of air to the halogenation section comprises a predetermined portion of the air supplied to the drying section, the exact size of said predetermined portion being controlled by the oxygen content of the recycle flue gas directed to the carbon burn-off zone.

Yet another object is to provide substantially solid baffle means between the cylindrical halogenation and drying sections of a catalyst regenerator which will permit downward flow of catalyst between the two sections but which will substantially prevent the upward flow of air so that a portion of the drying air can be vented and another portion can be directed, without the use of a fan or blower, to flow in a path outside the drying section and then in a countercurrent upward direction through the catalyst in the halogenation section.

The foregoing and other objects and advantages are achieved by the regenerator apparatus and process of the present invention in which the halogenation and drying sections are formed as a pair of generally cylindrical beds which are positioned axially adjacent each other. The halogenation and drying sections are separated by a baffle member which is solid except for a plurality of elongated tubes therein which allow the catalyst to pass downwardly to the drying zone while creating sufficient backpressure as to allow no more than a negligible amount of air to pass upwardly. At the top of the drying section, a pair of piping arrangements for exhausting air are mounted. A first piping arrangement leads to the halogenation section through an externally located path and is adapted to have steam and a halogen such as an organic chloride injected into the air carried therein. The injected mixture then passes upwardly from the halogenation section into the interior of the annular carbon burn-off zone where it combines with the combusted flue gas. The resultant recycle flue gas mixture is then injected as a combustion gas into the carbon burnoff zone.

The second piping arrangement is normally vented to the atmosphere and includes a valve to control the amount of air which is vented. The flow of air to the drying section is also controlled by a valve so that the quantity of drying air can be controlled independently of the operation of other portions of the apparatus. Thus, the exact desired amount of drying air can be provided to achieve a predetermined moisture level in the catalyst as it leaves the drying section. The valve controlling the venting of excess air through the second piping arrangement is operated in response to the amount of oxygen in the combustion gas being delivered to the carbon burn-off zone. For example, if it is desired to deliver said gas at an oxygen content of 0.8%, then, when an oxygen analyzer detects a greater oxygen content, a signal is sent to the valve controlling flow in the second piping arrangement to increase the amount of drying air being vented. The additional venting will of course result in a lesser amount of air from the drying section being delivered to the first piping arrangement and will thus reduce the oxygen content of the combustion gas. Conversely, if the oxygen analyzer detects a lower than desired oxygen content, it will operate the vent valve to pass less air through the second piping arrangement and permit more air to combine with the flue gas so as to increase the oxygen content of the combustion gas.

BRIEF SUMMARY OF THE DRAWING

The Drawing depicts a catalyst regeneration vessel, in which is located a catalyst drying zone, a catalyst halogenation zone, and a combustion zone for burning coke which was deposited on the catalyst in a reaction zone. Also, the Drawing depicts piping through which several gas streams are provided to and removed from the regeneration vessel.

DETAILED DESCRIPTION OF THE INVENTION

Referring to the drawing, the invention is illustrated in association with a section 10 of a cylindrical catalyst regeneration tower. The tower section illustrated includes a carbon burn-off section 12 comprising an annular bed 14 of catalyst particles 15 retained by a pair of inner and outer perforated screens 16, 18. Below the section 12 is a cylindrical halogenation section 22 comprising a cylindrical bed 24 of catalyst particles which is retained by a cylindrical wall 26. The cylindrical bed 24 is adapted to receive the catalyst particles which descend from annular bed 14. A curved baffle plate 30 separates the halogenation section 22 from the drying section 32 which also contains a cylindrical bed 34 of catalyst. In operation, the catalyst 15 passes uniformly through the apparatus by initially entering the upper fitting 40 and being distributed generally uniformly into the annular bed 14 between screens 16, 18 by a plurality of pipes 42. The catalyst bed then transforms from an annular shape to a cylindrical shape as it passes into bed 24. The catalyst particles reach bed 34 from bed 24 by passing through a plurality of elongated outlet pipes 44 mounted in baffle plate 30. Finally the particles exit the drying section 32 through a lower fitting 46. Although other structure is preferably present above and below fittings 40, 46, such structure has no bearing on the present invention and need not be described.

An important aspect of the present apparatus is that any desired quantity of dry heated air can be allowed to enter the drying zone 32 through inlet opening 50 in order to permit the wet catalyst which has descended into bed 34 from the bed 24 to be dried to a desired degree. Control over the amount of air admitted is by means of a flow control valve 52 operated by a flow controller 54. The temperature of the drying air is sensed by a temperature controller 56 which adjusts an electric power control 58 for the air heater 60. The source of the air is preferably the plant supply of compressed air. The drying air entering inlet 50 is preferably distributed uniformly upwardly in a counterflow manner through the cylindrical bed 34 from an annular chamber 62. For most uniform distribution, the chamber 62 is preferably substantially longer than illustrated, as discussed in my aforesaid U.S. patent application Ser. No. 780,788.

A first portion of the air which reaches the top of the drying section 32 exits through opening 64 into a first piping arrangement 65 while a second portion exits through opening 66 into a second piping arrangement 67. The amount of air which is vented through opening 66 is controlled by a valve 68 which will be hereinafter described. The air which exits through opening 64 has steam and a halogenation agent, such as an organic chloride, injected into it and is then reheated by the heater 72 before being directed into opening 74. The air mixture then passes into an annular chamber 76 which distributes it downwardly and then uniformly upwardly into the catalyst bed 24 in counterflow relation to the downward movement of the bed. When the air mixture reaches the top of bed 24 it will exit into open chamber 78 defined by the inner wall of screen member 16. As the air mixture moves up through open chamber 78 it will mix with the radially inwardly flowing flue gas exiting the screen 16 in the direction of the arrows. The flue gas has substantially no oxygen content after having contacted the coke covered catalyst in the bed 14 within the carbon burn-off section 12. However, by mixing the air mixture with the flue gas, a recycle flue gas mixture is produced. The recycle flue gas, which will have a variable oxygen content, depending upon the proportion of air in it, is delivered through exit opening 80 to a third piping arrangement 82. The third piping arrangement 82 includes a blower or fan 84 to force the recycled flue gas through a regeneration cooler 86, past an oxygen analyzer 88 and into the inlet opening 90 to the carbon burn-off section 12. Assuming that it is desired that the recycle flue gas or combustion gas entering the opening 90 have an oxygen content of 0.8%, for example, the signal generated by the oxygen analyzer 88 is used to control the operation of the valve 68, as indicated by the dot and dash line connection, to vent a greater or lesser amount of the drying air in section 32 through exit opening 66. The types of controls, analyzers and valves used are conventional and will not be described here. As previously noted, venting more air through opening 66 will decrease the amount left to exit through opening 64 and will therefore cause a decrease in the oxygen content of the recycle flue gas leaving exit opening 80. Conversely, venting less air through opening 66 will of course increase the oxygen content of the recycle flue gas. In a typical situation, the amount of air required by the halogenation section 22 and for combustion in the carbon burn-off section 12 might be only about 50% of that required by the drying section 32. The remainder of the air would be vented.

From the preceding description, it will be apparent that the flow of drying air which can enter the drying section 32 through inlet 50 can be controlled completely independently of the control means for the combustion air entering inlet opening 90. The latter control means comprises several elements, including the baffle plate means 30, the oxygen analyzer 88 and the valve means 68.

I claim:

1. A method for effecting regeneration of spent catalyst particles used in hydrocarbon conversion reactions comprising:
    (a) passing spent catalyst particles through a burn-off zone, by means of gravity, which is maintained at a coke-oxidizing temperature, wherein said catalyst is contacted with a recycle gas comprising oxygen;
    (b) passing catalyst leaving said burn-off zone through a halogenation zone, by means of gravity, wherein said catalyst is contacted with a halogenation gas comprising a halogen compound;
    (c) passing catalyst leaving said halogenation zone through a catalyst drying zone, by means of gravity, wherein water is removed from said catalyst;
    (d) compressing an air stream drawn from the atmosphere to an elevated pressure;
    (e) passing said compressed air stream, at a previously determined flow rate, through an air drying zone wherein water is removed from said air stream and heating said air stream;
    (f) passing said heated and dried air stream upward through said catalyst drying zone in countercurrent contact with catalyst, thereby removing the water from the catalyst;
    (g) withdrawing a first portion of the air stream emanating from said drying zone catalyst and mixing a halogen compound with it to form said halogenation gas;
    (h) passing said halogenation gas into contact with catalyst in said halogenation zone;
    (i) withdrawing halogenation gas from contact with said halogenation zone catalyst and mixing it with gas emanating from said burn-off zone catalyst to form said recycle gas;
    (j) passing said recycle gas through the catalyst in said burn-off zone to effect combustion of coke deposits on the catalyst;
    (k) withdrawing a second portion of the air stream emanating from the drying zone catalyst, where said first and second portions constitute the whole of the air stream emanating from the drying zone catalyst; and,
    (l) measuring the oxygen content of said recycle gas and varying the flow rate of said second portion of the air stream emanating from the drying zone, thereby varying the amount of air supplied to the burn-off zone from the drying zone by means of the halogenation zone.

2. The method of claim 1 further characterized in that said compressed air stream which is suppled to the drying zone is compressed to a sufficiently high pressure that said air stream will pass through the catalyst in the drying zone and the first portion of the air stream emanating from the drying zone will pass through the catalyst in the halogenation zone without further compression.

3. The method of claim 1 further characterized in that said halogenation gas is heated before it is passed into said halogenation zone.

4. The method of claim 1 further characterized in that steam is added to said halogenation gas before it is passed into said halogenation zone.

5. The method of claim 1 further characterized in that said recycle gas is cooled before it is passed into said burn-off zone.

* * * * *

UNITED STATES PATENT AND TRADEMARK OFFICE
CERTIFICATE OF CORRECTION

PATENT NO. : 4,701,429
DATED : October 20, 1987
INVENTOR(S) : Arthur R. Greenwood It is certified that error appears in the above-identified patent and that said Letters Patent is hereby corrected as shown below:

Title page, Item [62]:

In Related U.S. Application Data: Delete "abandoned".

Signed and Sealed this

Third Day of May, 1988

Attest:

DONALD J. QUIGG

Attesting Officer

Commissioner of Patents and Trademarks